United States Patent [19]

Medwin

[11] 4,225,954
[45] Sep. 30, 1980

[54] ACOUSTICAL DEVERBERATOR

[75] Inventor: Herman Medwin, Pebble Beach, Calif.

[73] Assignee: The United States of America as represented by the Secretary of the Navy, Washington, D.C.

[21] Appl. No.: 972,124

[22] Filed: Dec. 21, 1978

[51] Int. Cl.³ .............................................. G01S 3/80
[52] U.S. Cl. ................................... 367/118; 367/125; 367/135; 367/901
[58] Field of Search ............... 340/6 R; 325/305, 476; 367/118, 125, 127, 135, 901

[56] References Cited
U.S. PATENT DOCUMENTS 3,424,269  1/1969  Schroeder ..................... 340/3 R X
4,017,859  4/1977  Medwin ........................... 340/6 R X

*Primary Examiner*—Richard A. Farley
*Attorney, Agent, or Firm*—R. S. Sciascia; Charles D. B. Curry; Francis I. Gray

[57] ABSTRACT

An acoustical deverberator for eliminating the reverberation from a sound signal originating with a transient sound source in shallow water. The sound signal is received by a single hydrophone and autocorrelated to determine the time differences between the direct signal and the bottom surface reflected signals. Together with the surface and bottom reflection coefficients and known depths of the hydrophone and water, the time differences are used to determine corrections which are applied to the received sound signal. The result is a clean sound signal free from interfering reverberation.

7 Claims, 2 Drawing Figures

FIG_1

ACOUSTICAL DEVERBERATOR

BACKGROUND OF THE INVENTION

1. Field of the Invention

The present invention relates to acoustic signal reception, and more particularly to a system for eliminating acoustical reverberation from a sound source in shallow water.

2. Description of Prior Art

A short duration signal in shallow water is received by a hydrophone via direct, surface reflected and bottom reflected paths. Since the path lengths are different, the signals arrive at the hydrophone at different times and interfere. To obtain the true sounds produced by the signal source this interference, called reverberation, must be eliminated. At present there is no system which will eliminate acoustical reverberation to permit the receiver to determine the absolute spectral levels of the sound source.

SUMMARY OF THE INVENTION

Accordingly, the present invention provides an acoustical deverberator which autocorrelates a received sound signal at a single hydrophone. The relative time lags for the correlation peaks due to surface and bottom scattering are determined, and the range and depth of the source is calculated. The scattering characteristics of the surface and bottom obtained from secondary sound probes are calculated and applied as corrections to the original direct signal at the properly lagged times to eliminate the reverberation from the surface and bottom echoes. As a result the original signal is produced, cleansed of the reverberation which normally prevents its accurate measurement.

Therefore, it is an object of the present invention to obtain the source spectral sound levels of a transient source at sea free from the reverberant noise due to sound scatter at the surface and/or bottom.

Other objects, advantages and novel features of the present invention will be apparent from the following detailed description when read in view of the appended claims and attached drawing.

DESCRIPTION OF THE PREFERRED EMBODIMENT

In a reverberant environment the original signal from an acoustic point source is only realized if the reverberation is removed. The following theory assumes that the geometrical spreading from the point source is spherical, the water is isovelocity and the water depth is constant. Before deverberation can be applied the direct, surface reflected and bottom reflected path distances must be known. Normally, this information is obtained by knowing the source position and calculating the path distances from the known geometry. Generally three or four hydrophones are required, but in shallow water only a single hydrophone is required to gather all the information necessary for deverberation.

Figure 1:
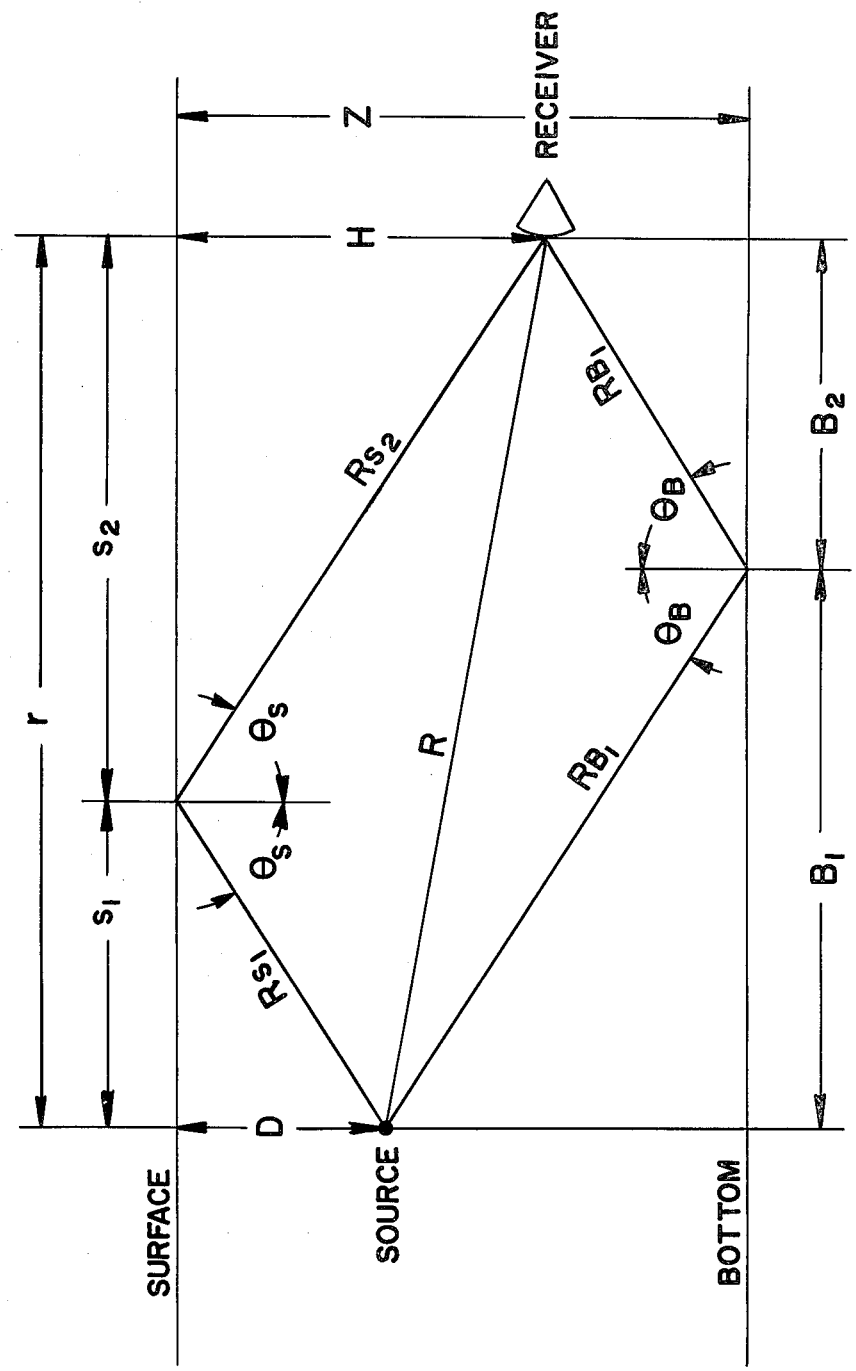

Referring now to FIG. 1 consider the direct (R), surface scattered ($R_s = R_{s1} + R_{s2}$) and bottom scattered ($R_B = R_{B1} + R_{B2}$) sounds received from a source at a single hydrophone receiver deployed in shallow water. When the differences between the arrival times for the three paths, R, $R_s$ and $R_B$, are known the three path distances can be calculated. For $R_s$ $$R_{s1}^2 = D^2 + S_1^2 \tag{1}$$

and $$R_{s2}^2 = H^2 + S_2^2 \tag{2}$$

where $$R^2 = r^2 + (H-D)^2, \tag{3}$$

$$\frac{r}{H+D} = \frac{S_1}{D} \tag{4}$$

and $$r^2 = \frac{(H+D)^2 S_1^2}{D^2}. \tag{5}$$

Substituting for $r^2$ in equation (3) and solving for $S_1^2$ produces $$S_1^2 = \frac{D^2}{(H+D)^2}(R^2 - (H-D)^2). \tag{6}$$

Likewise $$S_2^2 = \frac{H^2}{(H+D)^2}(R^2 - (H-D)^2). \tag{7}$$

Substitution into equations (1) and (2) produces $$R_{s1} = \frac{D}{H+D}(R^2 + 4HD)^{\frac{1}{2}} \tag{8}$$

and $$R_{s2} = \frac{H}{H+D}(R^2 + 4HD)^{\frac{1}{2}}. \tag{9}$$

Using $T_s$ as the time difference between the direct path R and the surface reflected path $R_s$ arrival and c as the mean speed of sound in the sea gives $$cT_s = R_{s1} + R_{s2} - R \tag{10}$$

and therefore $$cT_s = (R^2 + 4HD)^{\frac{1}{2}} - R \tag{11}$$

Similarly for the bottom specularly scatter path where $T_B$ is the time difference between the direct path R and the bottom reflected path $R_B$ arrival $$cT_B = (R^2 + 4(Z^2HD - Z(H+D)))^{\frac{1}{2}} - R \tag{12}$$

Solving equations (11) and (12) simultaneously for R, the range of the source from the receiver, and D, the depth of the source, produces $$D = \frac{T_s(c^2 T_s T_B + 4Z(Z-H)) - T_s(cT_B)^2}{4(HT_B + (Z-H)T_s)} \tag{13}$$

and $$R = \frac{4HD - (cT_s)^2}{2cT_s} \tag{14}$$

or $$R = \frac{H}{2c}\left[\frac{c^2 T_s T_B + 4Z^2 - 4ZH}{HT_B + (Z-H)T_s} - c^2 T_s\right]. \tag{15}$$

From the range and depth the surface reflected path distance is $$R_s = (R^2 + 4HD)^{\frac{1}{2}} \tag{16}$$

and the bottom reflected path distance is $$R_B = (R^2 + 4(Z^2 + HD - Z(H+D)))^{\frac{1}{2}} \tag{17}$$

Thus, knowing the time arrival differences, $T_s$ and $T_B$, determines the first three path differences. The paths for multiple reflections can be calculated also from the known geometry, assuming specular scatter.

For a transient signal such as a pulse, determination of the differential arrival times, $T_s$ and $T_B$, can be realized by an autocorrelation technique defined as $$R(T) = E[(v(t) - u)(v(t+T) - u)] \tag{18}$$

where v is the time average, u is the mean and E is the expected value of the received signal. Written as a digital summation equation, equation (18) becomes $$R(T) = n - T \sum_{i=1}^{n-T} [(v_i(t) - u)(v_{i+T}(t) - u)] \tag{19}$$

with n representing the total number of samples in the record. Performing the autocorrelation on the reverberant signal at the single hydrophone gives peaks at delay times corresponding to the zero delay time and the arrival delay times from the reflected signals. The peaks are realized only when the direct signal is delayed enough to correlate with the reflected signals. These delay times are then used to determine the range R, depth D and reflected path distances $R_s$ and $R_B$.

Deverberation may be applied in either the frequency or time domain. To eliminate reverberation in the frequency domain, assume only one frequency component whose amplitude and frequency are functions of time. For a signal with time-varying frequency and amplitude the pressure at the receiver due only to the direct path signal is $$P_D(t) = C(t) e^{jw(t)t} \tag{20}$$

Then taking into account spherical divergence, the spatial phase shift and specular scattering from a Gaussian rough surface, the pressure at the hydrophone due to the surface scattered signal can be written as $$P_s(t_s) = P_s(t - T_s) = \tag{21}$$
$$\frac{R}{R_s} e^{-g/2} C(t) e^{j(w(t)t - (R_s - R)k(t) + \Delta)} (t \geq T_s)$$

and the pressure due to the bottom reflected signal as $$P_B(t_B) = P_B(t - T_B) = \tag{22}$$
$$\frac{R}{R_B} RC(t) e^{j(w(t)t - (R_B - R)k(t) + \gamma)(t \geq T_B)}$$

R and $e^{-g/2}$ are the frequency-dependent pressure amplitude reflection coefficients, and $\gamma$ and $\Delta$ are the phase shifts due to the bottom and surface reflections, respectively. The surface reflection coefficient depends on the roughness of the surface (see co-pending application Ser. No. 967749 by Herman Medwin entitled "Surface Acoustic Signal Defader," filed Dec. 8, 1978) with the exponent for specular scattering being $$g^{\frac{1}{2}} = \frac{4\pi\sigma}{\lambda} \cos\theta_s \tag{23}$$

where $\sigma$ is the r.m.s. wave height, $\lambda$ is the wavelength of the sound signal and $\theta_s$ is the angle of incidence measured with the normal to the surface. The coherent sum of equations (20), (21) and (22) is the pressure sensed by the receiver.

For digital processing the continuous time dependence is replaced in the preceding equations by digital block numbers indicated by the subscript index K. Each block contains enough data samples of the incoming signal to give the desired spectral frequency resolution during a block duration which is small compared to the total duration of the time-varying signal. The frequency change of the signal within a block duration is assumed to be much smaller than the frequency resolution of the processing. The time the block ends is related to the continuous time t by $$t = TK; K = 1, 2, 3 \ldots \tag{24}$$

where $T = n/f_s$, $n$ = number of samples in the block and $f_s$ = sampling frequency.

The index i is used for the spectral frequency component of the complex wave being analyzed so that the equation for the source pressure at unit distance using frequency deverberation is $$D_{K,i}(1) e^{j(\beta K, i - Rki)} = R[C_{K,i} e^{j\phi K, i} \tag{25}$$
$$- \left( \frac{R}{R_s} e^{-g/2} D_{N,i} e^{j(\alpha N, i - (R_s - R)ki - \Delta)} \right)_{1(K-N)}$$
$$- \left( \frac{R}{R_B} R D_{M,i} e^{j(\alpha M, i - (R_B - R)ki - \gamma)} \right)_{1(K-M)}$$
$$- \left( \frac{R}{R_{SB}} R e^{-g/2} D_{L,i} e^{j(\alpha L, 1 - (R_{SB} - R)ki - \Delta - \gamma)} \right)_{1(K-L)}$$
$$- \text{ETC.}]$$

where $1(K-N)$, $1(K-M)$ and $1(K-L)$ are unity factors with values $$1(K-N) = 1 \; K \geq N$$
$$= 0 \text{ otherwise}$$
$$1(K-M) = 1 \; (K \geq M)$$
$$= 0 \text{ otherwise}$$
$$1(K-L) = 1 \; (K \geq L)$$
$$= 0 \text{ otherwise.}$$

The pressure amplitude of the $i^{th}$ frequency component in block K of the receiver reverberant signal is represented by $C_{K,i}$ and its phase by $\phi_{K,i}$. The deverberated pressure amplitude is represented by $D_{K,i}$ and its phase by $\beta_{K,i}$. The first term on the right hand side of equation (25) represents the received signal; the second term represents the correction due to a single surface specular scatter; the third term represents a single bottom reflection correction; the fourth term represents the correction for a surface and bottom reflection; and so on to include corrections for other multiple reflections if desired.

The block indices are determined by $$N = K - \frac{T_s}{T} \tag{26}$$

$$M = K - \frac{T_B}{T} \tag{27}$$

$$L = K - \frac{T_{SB}}{T} \tag{28}$$

The output of the deverberator for the frequency domain is a series of spectra at the consecutive blocks, and its Fourier transform is a time plot of the deverberated signal.

The above procedure takes the signal from the time domain (after A/D conversion) by Fourier transform to the frequency domain, where the known frequency dependent reflection coefficients are easily applied, and then back to the time domain to verify the effectiveness of the process.

When the reflection coefficients can be assumed to be frequency-independent, a simple point-by-point deverberation procedure can be applied in the time domain. The applicable temporal deverberation equation is $$D_K = C_K + <e^{-g/2}> \frac{R}{R_S} D_N - R \frac{R}{R_B} D_M + \quad (29)$$
$$<e^{-g/2}> R \frac{R}{R_{SB}} D_L + \text{ETC}$$

where $C_K$ represents the pressure amplitude for the $K^{th}$ sample. The other terms are similar to those of equation (25). For low roughness surfaces $g<1$ and the use of $e^{-g/2}$ over the appropriate frequencies is a good approximation essentially independent of frequency. One advantage of temporal deverberation is the relative freedom from restrictions of block size; the block size is determined only by the desired frequency resolution and the rate of change of frequency of the sound source.

Figure 2:
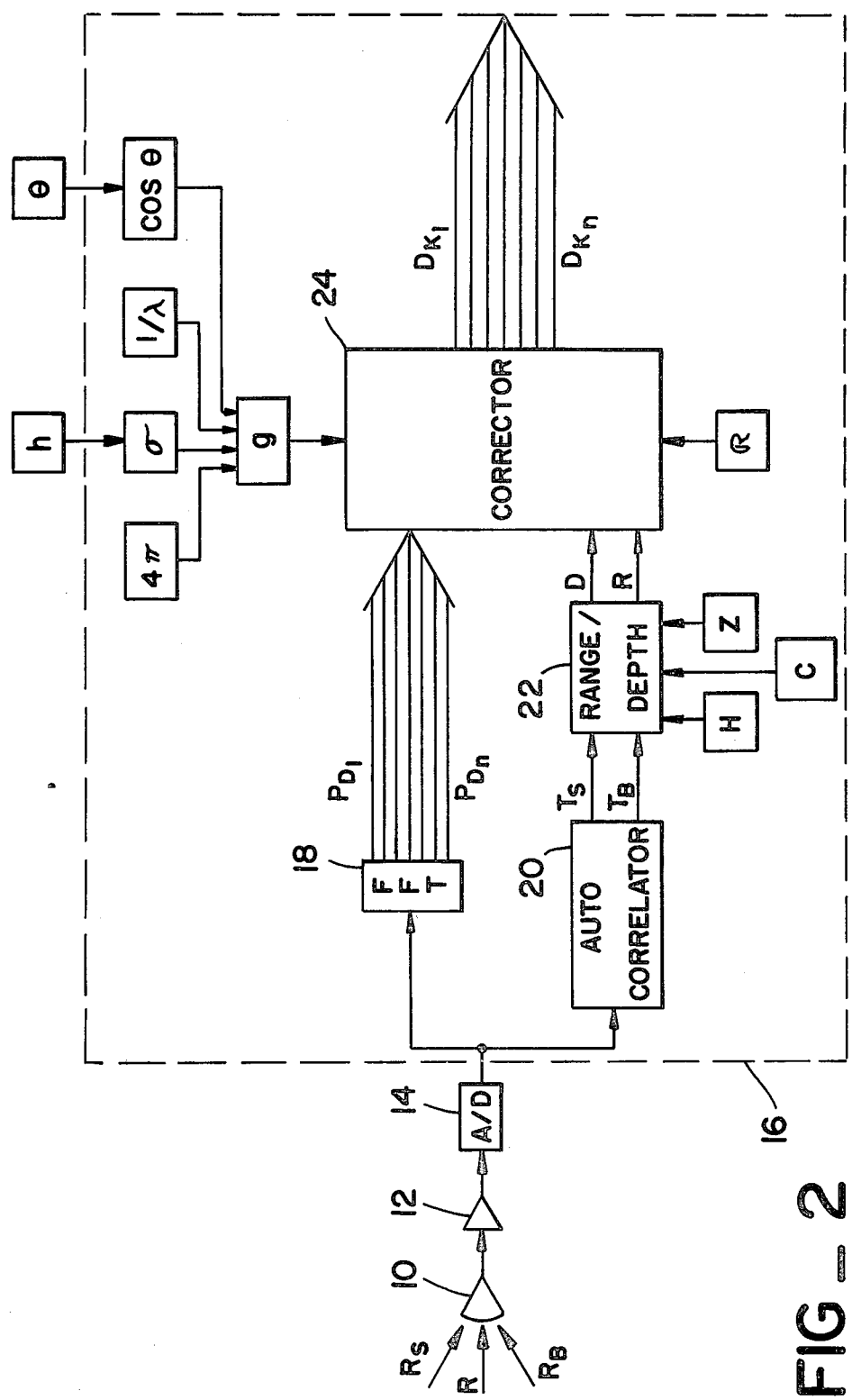

Referring now to FIG. 2 a hydrophone 10 receives the direct signal R and the surface and bottom reflected signals $R_S$ and $R_B$, respectively. An amplifier 12 amplifies the reverberation signal from the hydrophone 10. An analog-to-digital converter 14 converts the amplified reverberation signal to a digital reverberation signal. A deverberator 16 receives the digital reverberation and performs the necessary processes to produce a deverberated signal output.

The deverberator 16 receives the digital reverberation signal and inputs it to a fast Fourier transform processor 18 and to an autocorrelation processor 20. The fast Fourier transform processor 18 outputs a plurality of pressure amplitudes, $P_{D1}$ through $P_{DN}$, determined by the desired resolution and frequency range of interest. The autocorrelation processor 20 calculates the delay times for the single surface scattered signal and the single bottom reflected signal, $T_S$ and $T_B$ respectively. The autocorrelation processor 20 operates on the signal peaks and determines the delay time between successive peaks. For effective autocorrelation a frequency range of at least 1.2 to 1 between maximum and minimum frequencies of the received signal spectrum is desired. Using the known values of the hydrophone depth H, the depth of the water Z and the speed of sound in water c together with the calculated delay differences $T_S$ and $T_B$, a range/depth processor 22 computes the range R of the sound source from the hydrophone and the depth D of the sound source. A corrector processor 24 uses the computed range and depth, R and D, of the sound source together with a computed specular scattering coefficient g and the bottom frequency-dependent pressure amplitude reflection coefficient R to correct the input frequency domain reverberation signal. The scattering coefficient R and g are calculated using data obtained from separate known sound sources which are used as probes of the environment. The output of the corrector processor 24 is the deverberated signal, $D_{K1}$ through $D_{KN}$, in the frequency domain. To convert the output to the time domain another fast Fourier transform processor (not shown) may be used as is well-known in the field.

Thus, the present invention eliminates the reverberation in a received sound source signal by correcting for the surface and bottom reflected sound paths to produce a deverberated signal which is the true sound from the source.

What is claimed is:

1. An acoustic deverberator comprising:
   (a) means for receiving a sound signal from a transient sound souce in water, said sound signal having a direct signal component and surface and bottom reflected signal components;
   (b) means for transforming said received sound signal into a pressure amplitude for each of a plurality of discrete frequencies;
   (c) means for determining from said received sound signal the delay differences between said direct signal component and said surface and bottom reflected signal components;
   (d) means for computing, using said delay differences, the range of said sound source from said receiving means and the depth of said sound source in said water; and
   (e) means for correcting the pressure amplitude of said discrete frequencies using said sound source range and depth and known reflection coefficients to produce a deverberated signal.

2. An acoustic deverberator as recited in claim 1 wherein said receiving means comprises:
   (a) a single hydrophone to detect said sound signal;
   (b) means for amplifying said detected sound signal; and
   (c) means for converting said detected sound signal to a digital sound signal which represents said received sound signal.

3. An acoustic deverberator as recited in claim 2 wherein said transforming means comprises a fast Fourier transform (FFT) processor which transforms said received signal into said plurality of pressure amplitude discrete frequencies.

4. An acoustic deverberator as recited in claim 3 wherein said determining means comprises an autocorrelation processor which detects successive peaks of said received sound signal and which outputs said delay differences based upon the time differences between said successive peaks.

5. An acoustic deverberator as recited in claim 4 wherein said computing means comprises a range/depth processor to determine the range of said transient sound source from said hydrophone and to determine the depth of said transient sound source in said water, such determination being based upon said delay differences, the known depth of said hydrophone and the known depth of said water.

6. An acoustic deverberator as recited in claim 5 wherein said corecting means comprises a corrector processor which subtracts from said pressure amplitude discrete frequencies the signal components due to said surface and bottom reflected signal components, said corrector processor using said range and depth of said transient sound source, the known bottom reflection coefficient and the calculated surface reflection coefficient, said surface reflection coefficient being based upon surface wave height and angle of incidence of said surface reflection upon said receiving means, to produce the directly received frequency spectrum free from interference.

7. A method for eliminating reverberation in a sound signal received from a submerged transient sound source comprising the steps of:
 (a) receiving said sound signal with a single hydrophone, said sound signal being a complex sound signal due to surface and bottom reflections;
 (b) transforming said complex sound signal into a plurality of pressure amplitude discrete frequencies;
 (c) determining from the successive peaks of said complex sound signal the delay differences between the directly received sound signal and the surface and bottom reflected sound signals;
 (d) computing from said delay differences, from the known depth of said hydrophone and from the known depth of the water the range and depth of said transient sound source; and
 (e) correcting said pressure amplitude discrete frequencies by subtracting the surface and bottom reflected components determined from said range and depth of said transient sound source and from known surface and bottom reflection coefficients;
whereby a true frequency spectrum of said sound signal is output.

* * * * *